Patented Sept. 7, 1954

2,688,639

UNITED STATES PATENT OFFICE 2,688,639

N-(β-PHENOXYETHYL) ETHANOLAMINES

William S. Gump, Upper Montclair, and Edward Joseph Nikawitz, Passaic, N. J., assignors to The Givaudan Corporation, New York, N. Y., a corporation of New Jersey No Drawing. Application July 17, 1951,
Serial No. 237,282

6 Claims. (Cl. 260—570.7)

This invention relates to certain hydroxyamines and their salts, and more especially to those hydroxyamines which may be represented by the following general structural formula:

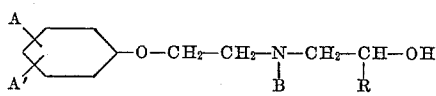

wherein A and A' are selected from H, lower alkyl and alkoxy, B is selected from alkyl, 1-naphthylmethyl, benzyl, alkyl-substituted benzyl, alkoxy-substituted 2-phenoxyethyl, and R is selected from H and alkyl. The salts contemplated by this invention are the salts of the aforementioned hydroxyamines and inorganic acids such as sulfuric, hydrochloric, hydrobromic, nitric or phosphoric acids, and the corresponding salts of alkane sulfonic acids, such as methyl-, ethyl-, and propyl-sulfonic acids.

In general, these compounds are prepared by reacting (1) 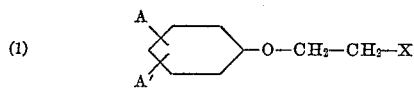

and (2) N-alkyl-2-aminoethanol, N-(1-naphthylmethyl)-2-aminoethanol, N - benzyl-2-aminoethanol, N-(alkyl-substituted benzyl)-2-aminoethanol, N-(alkoxy-substituted-benzyl)-2-aminoethanol, N - (2 - phenoxyethyl)-2-aminoethanol, N-(alkoxy-substituted - 2 - phenoxyethyl) - 2-aminoethanol or N-(alkyl-substituted-2-phenoxyethyl)-2-aminoethanol, or the corresponding aminopropanols, X being chlorine or bromine.

When B and the radical represented by

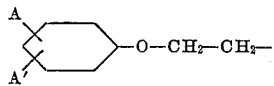

are the same, the reactants are the halide of the last indicated radical and 2-aminoethanol or 1-amino-2-propanol.

The novel salts of this invention can be prepared from the hydroxyamines by neutralization with the desired acid.

In general, the new amines of this invention are viscous liquids and the novel salts are crystalline solids. The novel amines are difficultly-soluble in water, but soluble in organic solvents such as ethyl alcohol, propylene glycol and acetone, the solubility depending upon the molecular size of the compound. The new amines of this invention are characterized by their boiling points at reduced pressure and refractive indices taken at 20° C. The purity of the amines was determined by potentiometric titration with N/2 hydrochloric acid. The novel salts are water soluble.

The novel compounds are suitable for medicinal use and for use in chemical synthesis, e. g., to form the corresponding halogenated compounds, i. e., those compounds wherein the OH is substituted by a halogen. These halogenated compounds are excellent sympatholytic and adrenolytic agents and also possess antihistaminic properties. For therapeutic purposes these compounds, preferably in the form of their salts, may be administered orally or parenterally, and may be employed in the form of tablets or in solutions.

In order to illustrate this invention more fully, but without thereby limiting it, the following examples are given.

EXAMPLE 1

*Preparation of N-benzyl-N-(2-phenoxyethyl)-2-aminoethanol*

94.2 grams of β-chlorophenetole (M. P. 23.5°–25° C.) were dropped under stirring into 181.2 grams of N-benzyl-2-aminoethanol over a period of one hour, while maintaining a temperature of 110°–120° C. The mixture was agitated and heated to 120°–130° C. for 6 hours.

A solution of 30 grams of sodium hydroxide in 240 cc. of water was added to the reaction mixture after completion of the foregoing treatment. Benzene (200 cc.) was then added and the benzene layer was separated and washed twice with 200 cc. of water. Anhydrous sodium sulfate (about 20 grams) was used to dry the washed benzene extract, which was then filtered to remove the salt. The benzene was removed by atmospheric distillation, and the residue was subjected to distillation under high vacuum (5 mm. of mercury).

After lower boiling material distilled over, 127 grams of the desired N-benzyl-N-(2-phenoxyethyl)-2-aminoethanol, distilling at 205°–225° C., were obtained. Upon redistillation this latter fraction yielded 110 grams of substantially pure N - benzyl-N-(2-phenoxyethyl)-2-aminoethanol, B. P. 207°–213° C. (6 mm.); $n_D^{20}$ 1.5599.

EXAMPLE 2

*Preparation of N,N-di-(2-phenoxyethyl)-2-aminoethanol*

156 grams of β-chlorophenetole were dropped under stirring into 62 grams of 2-aminoethanol over a period of one hour at 100°–110° C. The mixture was then heated to 120° C. and maintained thereat, under stirring, for 6 hours.

A solution of 40 grams of sodium hydroxide in 200 cc. of water was added to the reaction mixture after completion of the foregoing treatment. Benzene (200 cc.) was then added and the benzene layer was separated and washed twice with 200 cc. of water. Anhydrous sodium sulfate (about 20 grams) was used to dry the washed benzene extract, which was then filtered to remove the salt. The benzene was removed by atmospheric distillation, and the residue was subjected to high vacuum distillation (4 mm. of mercury).

After lower boiling material distilled over, 74.9 grams, distilling at 225°–265° C., were obtained. Upon redistillation, 39.6 grams of substantially pure N,N - di-(2-phenoxyethyl)-2-aminoethanol, B. P. 245°–250° C. (5 mm.), $n_D^{20}$ 1.5548, were obtained.

EXAMPLE 3

*Preparation of N,N-di-(2-o-toloxyethyl)-2-aminoethanol*

68 grams of 2-chloroethyl-o-tolylether, prepared in accordance with the method given in Example 5, part (b), were dropped into 25 grams of 2-aminoethanol over a period of 2 hours, while agitating the mixture and maintaining a temperature of 100° C.

The procedure of Example 2 was followed from this point, 18 grams of substantially pure N,N-di-(2-o-toloxyethyl)-2-aminoethanol distilling at 223°–243° C. under a pressure of 3 mm. of mercury being obtained. The hydrochloride, hydrobromide and nitrate of this base are white, crystalline substances, melting respectively at 138°–139° C., 119°–120° C., and 94°–95° C.

EXAMPLE 4

*Preparation of N,N,-di-(2-p-toloxyethyl)-2-aminoethanol*

170.5 grams of 2 - chloroethyl - p - tolylether (B. P. 92°–97° C. at 5 mm. of mercury pressure), prepared in accordance with the method of Example 5, part (b) except that p-cresol was used in place of o-cresol, were dropped into 61 grams of 2-aminoethanol over a period of one hour while agitating the mixture and maintaining a temperature of 110° C.

The procedure of Example 2 was followed from this point, 63 grams of substantially pure N,N-di-(2-p-toloxyethyl)-2-aminoethanol distilling at 230°–250° C. under a pressure of 3 mm. of mercury being obtained.

EXAMPLE 5

*Preparation of N-(1-naphthylmethyl)-N-(2-o-toloxyethyl)-2-aminoethanol*

(a) PREPARATION OF N-(1-NAPHTHYLMETHYL)-2-AMINOETHANOL

|   | Grams |
|---|---|
| 1-(chloromethyl) naphthalene | 176.45 |
| 2-aminoethanol | 490.0 |

The chloride was dropped during 2 hours at 100° C. inside temperature into the amino alcohol, the mixture being stirred in a 3 liter round bottom flask fitted with mercury seal, reflux condenser, thermometer and stirrer. Heating was then continued for 2 hours. After cooling to room temperature, 40 grams of caustic soda in 40 cc. of water and 200 cc. of ethyl alcohol were added to precipitate the salt which was separated from the solution by filtration. The solvent was removed by distillation in low vacuum. High vacuum distillation yielded the following fractions:

(1) At 4 mm., 190–194° C., 3 grams.
(2) At 4 mm., 194–214° C., 153.5 grams.

Fraction 2 was redistilled.

(1a) At 4 mm., 190–194° C., 5 grams.
(2b) At 4 mm., 194–206° C., 140 grams, brown oil.

Fraction 2b represented the desired compound with a purity of 100.5%: $n_D^{20}$ 1.6195.

(b) PREPARATION OF 2-CHLOROETHYL-O-TOLYL ETHER 2-o-toloxyethanol was prepared as follows:

Ortho-cresol (760 grams), ethyl alcohol (1,000 cc.) and sodium hydroxide solution (280 grams in 300 cc. of water) were charged into a 4 liter round bottom flask, fitted with stirrer, reflux condenser and dropping funnel. Ethylene chlorohydrin (580 grams) was dropped during 2 hours into the refluxing contents of the flask. Refluxing and agitating were continued for 5 hours.

The solution was then allowed to remain at room temperature over night to accomplish the precipitation of the salt as completely as possible. After separation of the salt by filtration, the solvent was distilled off at low vacuum. The residue was dissolved in 800 cc. of benzene and the benzene solution was washed twice with 500 cc. of water. Drying with anhydrous sodium sulfate, filtration and distillation of the solvent preceded high vacuum distillation in an 18 inch asbestos covered Vigreux column.

The following fractions were obtained:

(1) At 4 mm., 100–106° C., 22.2 grams.
(2) At 4 mm., 106–115° C., 858.0 grams.

Fraction 2 was redistilled.

(1a) At 4 mm., until 105° C., 10.0 grams.
(2b) At 4 mm., 105–110° C., 813.0 grams.

Fraction 2b, a colorless oil, represented the desired compound, 2 - o - toloxyethanol; $n_D^{20}$ 1.5350; purity 100% (determined by acetylation).

Pyridine (420 grams) and a solution of 800 grams of 2-o-toloxyethanol in 800 cc. of chloroform were charged into a 5 liter round bottom flask fitted with stirrer, dropping funnel and reflux condenser, being cooled in an ice bath. A thionyl chloride solution (680 grams of thionyl chloride in 600 cc. of chloroform) was dropped into the stirred mixture during 2 hours. The cooling bath was removed after completion of the addition and the solution was permitted to remain at room temperature over night. About 60% of the solvent was then removed by distillation at atmospheric pressure. A rather vigorous development of sulfur dioxide could be noticed at this stage. The residual part was washed twice with 500 cc. of water and dried with anhydrous sodium sulfate. The rest of the solvent was removed by distillation in low vacuum.

High vacuum distillation of the residue yielded the following fractions:

(1) At 4 mm., 87–90° C., 10.0 grams, discarded.
(2) At 4 mm., 90–95° C., 802.1 grams.

Fraction 2 represented the desired compound; $n_D^{20}$ 1.5280; purity 98% (based on chlorine determination).

(c) PREPARATION OF N-(1-NAPHTHYLMETHYL)-N-(2-O-TOLOXYETHYL)-2-AMINOETHANOL

|   | Grams |
|---|---|
| N-(1-naphthylmethyl)-2-aminoethanol | 68.0 |
| 2-chloroethyl-o-tolylether | 29.0 |

The halogen compound was dropped during 2 hours at 120° C. inside temperature into the amino alcohol, the mixture being stirred in a 500 cc. round bottom flask fitted with mercury seal, thermometer, reflux condenser and stirrer. Heating to 120° C. and stirring were continued for 8 hours. 200 cc. of a 10% caustic soda solution were then added and the organic matter was shaken out with 300 cc. of benzene. The solution which was obtained was separated from the aqueous layer and washed twice with 300 cc. of water. Drying with anhydrous sodium sulfate, filtration and removal of the solvent by distillation in low vacuum made the product ready for high vacuum distillation. The following fractions were obtained:

(1) At 4 mm., 110–185° C., 4 grams.
(2) At 4 mm., 185–210° C., 5 grams.
(3) At 4 mm., 210–300° C., 42 grams.

Fraction 3 was redistilled.

(1a) At 4 mm., 100–265° C., 15 grams.
(2b) At 4 mm., 265–285° C., 31 grams, heavy, brown oil.

Fraction 2b was the desired compound.

| Analysis | Calculated | Found |
|---|---|---|
| Percent C | 78.8 | 80.8 |
| Percent H | 7.46 | 7.34 |

EXAMPLE 6

*Preparation of N-benzyl-N-(2-o-isopropylphenoxyethyl)-2-aminoethanol*

(a) PREPARATION OF N-(2-O-ISOPROPYLPHENOXYETHYL)-2-AMINOETHANOL 2-bromoethyl-o-isopropylphenyl ether was prepared as follows:

o-Isopropylphenol_____ 556.0 grams.
Ethylene dibromide_____ 939.5 grams.
Sodium hydroxide_____ 155.0 grams in 300 cc. of water.
Water_____ 600 cc.

The sodium hydroxide solution was dropped during 2 hours into the mixture of bromide, water and o-isopropylphenol being vigorously stirred and refluxed in a 4 liter round bottom flask fitted with mercury seal, reflux condenser, stirrer and dropping funnel. Refluxing and stirring were then continued for 12 hours. After cooling to room temperature, the oily layer was separated from the aqueous layer and washed with 500 cc. of water after addition of 300 cc. of benzene. The benzene was removed by distillation in low vacuum after drying the solution with anhydrous sodium sulfate. The residual oil was distilled in high vacuum. The following fractions were obtained:

(1) At 50–60 mm., 55–100° C., 326.0 grams, ethylene dibromide recovered.
(2) At 5 mm., 70–90° C., 455.1 grams, o-isopropylphenol recovered.
(3) At 5 mm., 90–110° C., 25.2 grams.
(4) At 5 mm., 110–125° C., 72.1 grams.

Fraction 4 was redistilled. The following fractions were obtained:

(1a) At 4 mm., 105–115° C., 2.7 grams.
(2b) At 4 mm., 115–129° C., 62.5 grams, nearly colorless oil.

Fraction 2b is the desired material; purity 95%; $n_D^{20}$ 1.5350.

60 grams of the bromo ether were dropped during 2 hours at 110° C. inside temperature into 80 grams of 2-aminoethanol, the mixture being stirred in a 500 cc. round bottom flask fitted with dropping funnel, mercury seal, stirrer and reflux condenser. Heating to 110° C. was then continued for 4 hours. After cooling to room temperature, 10 grams of caustic soda in 10 cc. of water and 200 cc. of ethyl alcohol were added and the precipitated salt was separated by filtration. The solvent and the excess of 2-aminoethanol were removed by distillation in low vacuum. High vacuum distillation yielded the following fractions:

(1) At 4 mm., 65–170° C., 5.0 grams.
(2) At 4 mm., 170–185° C., 41.1 grams.

Fraction 2 was redistilled.

(1a) At 4 mm., until 175° C., 1.0 gram.
(2b) At 4 mm., 175–185° C., 34.0 grams, nearly colorless oil.

Fraction 2b, the desired material, had a purity of 99%; $n_D^{20}$ 1.5252.

(b) PREPARATION OF N-BENZYL-N-(2-O-ISOPROPYLPHENOXYETHYL)-2-AMINOETHANOL

|  | Grams |
|---|---|
| N-(2-o-isopropylphenoxyethyl)-2-o-aminoethanol | 40.0 |
| Benzyl chloride | 24.0 |
| Anhydrous potassium carbonate | 50.0 |

The benzyl chloride was dropped at 110° C. inside temperature during 30 minutes into the stirred mixture of the amino alcohol and potassium carbonate. Stirring was then continued for 6 hours while the temperature was increased to 150° C. 200 cc. of a 10% aqueous caustic soda solution were added after the reaction mixture had been allowed to cool to 60° C. The organic matter was shaken out with 300 cc. of benzene and the solution which was obtained was prepared in the usual manner for high vacuum distillation. The following fractions were separated:

(1) At 5 mm., 145–230° C., 5 grams.
(2) At 5 mm., 230–260° C., 29.4 grams.
(3) At 5 mm., 260–270° C., 5 grams.

Fraction 2 was redistilled.

(1a) At 4 mm. until 225° C., 1.3 grams.
(2b) At 4 mm., 225–240° C., 21.2 grams, brownish oil; purity 97%.

EXAMPLE 7

*Preparation of N-benzyl-N-(2-o-ethylphenoxyethyl)-2-aminoethanol*

(a) PREPARATION OF N-(2-O-ETHYLPHENOXYETHYL)-2-AMINOETHANOL

This was prepared in similar manner as that described in Example 6, part (a). Here, 51 grams of the 2-bromoethyl-o-ethylphenyl ether yielded 28.9 grams of the desired amino alcohol, boiling at 165°–175° C. under a pressure of 4 mm. of mercury.

(b) PREPARATION OF N-BENZYL-N-(2-O-ETHYLPHENOXYETHYL)-2-AMINOETHANOL

A mixture of 27 grams of N-(2-o-ethylphenoxyethyl)-2-aminoethanol, 17 grams of benzyl chloride and 50 grams of anhydrous potassium carbonate was heated for 15 minutes at 120° C. and then for 10 hours at 150° C. following the general procedure described for the preparation of N-benzyl-N-(2-o-isopropylphenoxyethyl)-2-aminoethanol. The yield amounted to 22.7 grams of a brown oil possessing a boiling range of 220°–235° C. at 4 mm. pressure.

EXAMPLE 8

*Preparation of N-ethyl-N-(2-o-toloxyethyl)-2-aminoethanol*

This compound was prepared from commercial

N-ethyl-2-aminoethanol and 2-chloroethyl-o-tolylether (prepared as in example 5, part (b)). These substances were heated at 100° C. for 6 hours and the crude reaction product was isolated. The purified end product had a boiling range of 166°–170° C. under 4 mm. pressure, and possessed a purity of 100.5%; $n_D^{20}$ 1.5200.

EXAMPLE 9

*Preparation of N-benzyl-N-(2-o-toloxyethyl)-2-aminoethanol*

|   | Grams |
|---|---|
| N-benzyl-2-aminoethanol | 110 |
| 2-chloroethyl-o-tolyl ether | 60 |

The starting materials were charged into a 1 liter round bottom flask fitted with stirrer, reflux condenser and thermometer. The mixture was then heated 6 hours to 160°–170° C. and a solution of 150 grams of caustic soda in 500 cc. of water was added and the organic matter was then shaken out with 500 cc. of benzene. The benzene solution was dried with anhydrous sodium sulfate and filtered.

High vacuum distillation yielded, after removal of the solvent at atmospheric pressure, the following fractions (an 8 inch asbestos covered Vigreux column was used):

(1) At 4 mm., 135–210° C., 44.8 grams.
(2) At 4 mm., 210–230° C., 80.1 grams.

Fraction 2 was redistilled.

(1a) At 4 mm., 202–215° C., 8.9 grams.
(2b) At 4 mm., 215–223° C., 64.2 grams, yellow oil.

Fraction 2b, the desired material, possessed a purity of 101%; $n_D^{20}$ 1.5590.

EXAMPLE 10

*Preparation of N-benzyl-N-(2-o-methoxyphenoxyethyl)-2-aminoethanol*

(a) PREPARATION OF 2-(O-METHOXYPHENOXY)-ETHANOL

|   |   |
|---|---|
| Guaiacol | 620 grams |
| Ethylene chlorohydrin | 400 grams. |
| Sodium hydroxide | 200 grams in 200 cc. of water. |
| Alcohol | 1000 cc. |

The ethylene chlorohydrin was dropped during 2 hours into the solution of the other components being stirred and refluxed in a 4 liter round bottom flask fitted with mercury seal, reflux condenser, dropping funnel and stirrer. Refluxing and agitating were then continued for 6 hours. After separating the salt by filtration, the alcohol was removed by distillation in low vacuum. The residual oil was dissolved in 500 cc. of benzene. This solution was washed with 300 cc. of a 10% aqueous caustic solution, then with 500 cc. of water and finally dried with anhydrous sodium sulfate. The residue which was obtained after separating the salt by filtration and removal of the solvent yielded the following fractions when distilled in high vacuum:

(1) At 5 mm., until 133° C., 13.2 grams.
(2) At 5 mm., 133–136° C., 546.0 grams, desired material; purity 97.6%; $n_D^{20}$ 1.5418.

(b) PREPARATION OF 2-CHLOROETHYL-O-METHOXYPHENYL ETHER

|   |   |
|---|---|
| 2 - (o - methoxyphenoxy)-ethanol. | 510 grams in 500 cc. of chloroform. |
| Pyridine | 250 grams. |
| Thionyl chloride | 400 grams in 500 cc. of chloroform. |

The procedure of Example 5, part (b) was followed.

High vacuum distillation yielded at 4 mm. pressure a fraction boiling from 123°–129° C. which congealed (M. P. 41–43° C.). Purity of 102% was based on chlorine determination.

(c) PREPARATION OF N-BENZYL-N-(2-O-METHOXYPHENOXYETHYL)-2-AMINOETHANOL

|   | Grams |
|---|---|
| 2-chloroethyl-o-methoxyphenyl ether | 56.0 |
| N-benzyl-2-aminoethanol | 95.0 |

The components was stirred and heated for 3 hours to 180° C. 300 cc. of a 10% aqueous sodium hydroxide solution were then added and the amino alcohols were shaken out with 300 cc. of benzene. The benzene solution was washed with 500 cc. of water, dried with anhydrous sodium sulfate, filtered from the salt and finally distilled in vacuum. After removal of the benzene, the following fractions were separated:

(1) At 5 mm., 140–225° C., 57.3 grams.
(2) At 5 mm., 225–255° C., 47.7 grams.

Fraction 2 was redistilled.

(1a) At 5 mm., 215–230° C., 5.1 grams.
(2b) At 5 mm., 230–245° C., 34.5 grams, desired material; purity 102%; $n_D^{20}$ 1.5640.

EXAMPLE 11

*Preparation of N-(2-o-methoxyphenoxyethyl)-N-(2-o-toloxyethyl)-2-aminoethanol*

(a) PREPARATION OF 2-BROMOETHYL-O-METHOXYPHENYL ETHER

|   |   |
|---|---|
| Guaiacol | 500 grams |
| Ethylene dibromide | 940 grams |
| Sodium hydroxide | 155 grams in 250 cc. of water |
| Water | 500 cc. |

Guaiacol, ethylene dibromide and water were charged into a 4 liter round bottom flask fitted with stirrer, dropping funnel and reflux condenser. The sodium hydroxide solution was then dropped during 2 hours into the vigorously stirred and refluxing mixture. Agitating and refluxing were continued for 20 hours. After cooling to room temperature, the aqueous fraction was separated from the oily layer; the latter one was mixed with 500 cc. of benzene and the benzene solution was washed with 500 cc. of water and dried with anhydrous sodium sulfate. The benzene was removed in low vacuum and the residual liquid was submitted to high vacuum distillation.

The following fractions were obtained:

(1) At 70–80 mm., 60–100° C., 279.0 grams.
(2) At 4 mm., 70–100° C., 128.6 grams.
(3) At 4 mm., 100–130° C., 298.9 grams.

Fraction 3 was redistilled.

(1a) At 4 mm., 85–120° C., 17.6 grams.
(2b) At 4 mm., 120–130° C., 272.4 grams.

Fraction 2b represented the desired compound and possessed a purity of 96%.

(b) PREPARATION OF N-(2-O-METHOXYPHENOXYETHYL)-2-AMINOETHANOL

|   | Grams |
|---|---|
| 2-bromoethyl-o-methoxyphenyl ether | 96.0 |
| 2-aminoethanol | 100.0 |

The bromo ether was dropped during one hour at 100°–120° C. into the amino alcohol being stirred and heated in a 500 cc. round bottom flask fitted with mercury seal, dropping funnel, reflux condenser, thermometer and stirrer. Heating to 120° C. was then continued for 6 hours. After cooling to room temperature, a solution of 16 grams of sodium hydroxide in 20 cc. of water and 200 cc. of ethyl alcohol were added to precipitate the salt. The solvent was removed by distillation in low vacuum after the salt had been filtered off.

High vacuum distillation yielded the following fractions:

(1) At 4 mm., 60–180° C., 79.4 grams.
(2) At 4 mm., 180–205° C., 69.7 grams.

Fraction 2 was redistilled.

(1a) At 4 mm., 70–185° C., 6.0 grams.
(2b) At 4 mm., 185–200° C., 53.0 grams, desired material.

(c) PREPARATION OF N-(2-O-METHOXYPHENOXYETHYL)-N-(2-O-TOLOXYETHYL)-2-AMINOETHANOL

|  | Grams |
|---|---|
| N-(2 - o - methoxyphenoxyethyl)-2-aminoethanol | 21.1 |
| 2-bromoethyl-o-tolyl ether | 21.5 |
| Anhydrous potassium carbonate | 50.0 |

The halogen compound, prepared as in part (a) of this example except that o-cresol was used here in place of guaiacol, was dropped during 10 minutes at 110° C. into the stirred mixture of the amino alcohol and potassium carbonate. The temperature was then increased for 7 hours to 140°–150° C. After cooling to 60° C., 200 cc. of a 20% aqueous sodium hydroxide solution were added and the organic matter was shaken out with 200 cc. of benzene. Drying with anhydrous sodium sulfate, filtration and removal of the solvent by distillation in low vacuum made the residue ready for high vacuum distillation.

(1) At 4 mm., 120–250° C., 4.4 grams.
(2) At 4 mm., 250–270° C., 16.7 grams.

Fraction 2 was redistilled.

(1a) At 4 mm., 190–255° C., 1.0 gram.
(2b) At 4 mm., 255–270° C., 11.4 grams, brown oil.

Fraction 2b, the desired material, had a purity of 94%.

EXAMPLE 12

*Preparation of N-benzyl-N-(2-p-methoxyphenoxyethyl)-2-aminoethanol*

(a) PREPARATION OF 2-BROMOETHYL-P-METHOXYPHENYL ETHER

This was prepared in accordance with the procedure of Example 11, part (a), using hydroquinone monomethyl ether in place of guaiacol. The desired product boiled at 130°–138° C. under a pressure of 4 mm. of mercury and solidified on standing.

(b) PREPARATION OF N-(2-P-METHOXYPHENOXYETHYL)-2-AMINOETHANOL

|  | Grams |
|---|---|
| 2-bromoethyl-p-methoxyphenyl ether | 96.0 |
| 2-aminoethanol | 100.0 |

The procedure as described in Example 11, part (b), was followed.

High vacuum distillation yielded the following fractions:

(1) At 4 mm., 70–190° C., 5 grams.
(2) At 4 mm., 190–200° C., 76.1 grams.

Fraction 2 was redistilled.
(1a) At 4 mm., until 193° C., 2 grams.
(2b) At 4 mm., 193–200° C., 55.2 grams, solid.

Fraction 2b, the desired material, had a purity of 100%.

(c) PREPARATION OF N-BENZYL-N-(2-P-METHOXYPHENOXYETHYL)-2-AMINOETHANOL

|  | Grams |
|---|---|
| N-(p-methoxyphenoxyethyl) - 2 - aminoethanol | 42.0 |
| Benzyl chloride | 25.4 |
| Potassium carbonate | 50.0 |

The benzyl chloride was dropped during 1 hour at 110° C. inside temperature into the stirred mixture of the amino alcohol and potassium carbonate. Heating to 110° C. was continued for 3 hours and then finally to 160° C. for 2 hours. 200 cc. of a 20% aqueous sodium hydroxide solution were then added and the organic matter was shaken out with 300 cc. of benzene. The solution was washed with water, dried with 300 cc. of anhydrous sodium sulfate, filtered and distilled in vacuum.

The following fractions were obtained after removal of the benzene:

(1) At 4 mm., 150–250° C., 3.8 grams.
(2) At 4 mm., 250–260° C., 44.7 grams.

Fraction 2 was redistilled.

(1a) At 4 mm., until 246° C., 1.0 gram.
(2b) At 4 mm., 246–250° C., 37.7 grams, brown oil.

Fraction 2b represented the desired compound with a purity of 100%; $n_D^{20}$ 1.6195.

EXAMPLE 13

*Preparation of N-ethyl-N-(2-o-methoxyphenoxyethyl)-2-aminoethanol*

|  | Grams |
|---|---|
| 2-chloroethyl-o-methoxyphenyl ether | 75 |
| N-ethyl-2-aminoethanol | 75 |

The components were stirred and heated for 3 hours to 180° C. in a 500 cc. flask fitted with mercury seal, stirrer, thermometer and reflux condenser. The procedure was continued as described in Example 10, part (c).

High vacuum distillation yielded the following fractions:

(1) At 5 mm., 150–175° C., 4.0 grams.
(2) At 5 mm., 175–185° C., 39.0 grams.

Fraction 2 was redistilled.

(1a) At 5 mm., until 177° C., 1.0 gram.
(2b) At 5 mm., 177–180° C., 33.7 grams, yellow oil.

Fraction 2b, the desired compound, had a purity of 101%; $n_D^{20}$ 1.5245.

EXAMPLE 14

*Preparation of N,N-di-(2-o-toloxyethyl)-1-amino-2-propanol*

|  | Grams |
|---|---|
| 2-chloroethyl-o-tolylether | 170.45 |
| 1-amino-2-propanol | 75.0 |

The halogen compound was dropped during 2 hours at 110–120° C. into the stirred amino alcohol. A temperature of 150–160° C. was then maintained for 6 hours. After cooling to room temperature, 200 cc. of a 20% aqueous sodium hydroxide solution were added and the mixture was extracted with 200 cc. of benzene. The benzene solution was then washed with 200 cc. of water, dried with anhydrous sodium sulfate, filtered, and distilled.

High vacuum distillation yielded, after removal of the benzene, the following fractions:

(1) At 5 mm., 88–216° C., 30.7 grams.
(2) At 5 mm., 218–258° C., 107.6 grams.

Fraction 2 was redistilled; the desired substance collected at a boiling range from 229°–249° C. at 5 mm. A yield of 35.7 grams of mushy crystals having a purity of 99% was obtained.

The hydrochloride and nitrate of this base are white crystalline solids, melting respectively at 124°–126° C. and 153°–155° C.

EXAMPLE 15

Salts of the hydroxyamines prepared in accordance with Examples 1 to 14 were prepared by neutralizing the hydroxyamines with sulfuric acid, hydrochloric acid, hydrobromic acid, nitric acid, phosphoric acid, methyl sulfonic acid, ethyl sulfonic acid, or propyl sulfonic acid.

In general, these salts were crystalline solids, some however being viscous, resinous liquids.

Examples

N,N-di-(2-o-toloxyethyl) - 2 - aminoethanol hydrochloride, melting point—138°–139° C.

N,N-di-(2-o-toloxyethyl) - 2 - aminoethanol hydrobromide, melting point—119°–120° C.

N,N-di-(2-o-toloxyethyl) - 2 - aminoethanol nitrate, melting point—94°–95° C.

N-ethyl-N-(2-o-toloxyethyl)-2-aminoethanol hydrochloride, melting point—92°–93° C.

N-ethyl-N-(2-o-toloxyethyl)-2-aminoethanol nitrate, melting point—60°–62° C.

N,N-di-(2-o-toloxyethyl) - 1-amino - 2 - propanol hydrochloride, melting point—124°–126° C.

N,N-di-(2-o-toloxyethyl) - 1 - amino - 2-propanol nitrate, melting point—153°–155° C.

EXAMPLE 16

*Preparation of N-ethyl-N-(2-o-isopropylphenoxyethyl)-2-aminoethanol*

(a) PREPARATION OF 2-(O-ISOPROPYLPHENOXY) ETHANOL 450 g. of ethylene chlorohydrin were dropped during 3 hours into a stirred and refluxing solution of 540 g. of o-isopropylphenol and 200 g. of sodium hydroxide in 1000 ml. of alcohol and 200 ml. of water. Refluxing was then continued for 5 hours. After cooling and filtration, the solvent was removed by distillation at reduced pressure. The residue was poured into water, the organic matter extracted with benzene and the benzene solution washed with diluted caustic and finally with water. The benzene was distilled off after drying with anhydrous sodium sulfate and filtration. The desired compound distilled at 4 mm. pressure of mercury at 117–127° C. The yield of the nearly colorless oil amounted to 524.6 g.; $n_D^{20}$ 1.5200; purity 101% (determined by acetylation).

(b) PREPARATION OF β-CHLORO-O-ISOPROPYL PHENETOLE 270 g. of thionyl chloride dissolved in 300 ml. of ethylene dichloride were dropped during 2 hours into a stirred and cooled solution of 360 g. of the above hydroxy ether in 500 ml. of ethylene dichloride and 180 g. of pyridine. After standing at room temperature for 20 hours, the reaction product was heated under reflux for 2 hours on the steam bath. The warm solution was washed twice with 500 ml. of water and dried with anhydrous sodium sulfate. After removal of the solvent by distillation, 344 g. of the desired compound, a colorless oil, distilled at a pressure of 4 mm. of mercury at 105–110° C.; $n_D^{20}$ 1.5180; purity 100.0% (by chlorine determination).

(c) N-ETHYL-N-(2-O-ISOPROPYLPHENOXYETHYL)-2-AMINOETHANOL 140 g. of the above chloride were dropped during 2 hours into 140 g. of N-ethyl-2-aminoethanol being stirred and heated to 110° C. Heating was then continued for 5 hours at 160–170° C. After cooling to room temperature, 200 ml. of a 20% aqueous sodium hydroxide solution were added, the amino alcohols were shaken out with 500 ml. of benzene, this solution was dried, filtered and finally distilled. The amino alcohol boiled at 168–178° C. at 4 mm. pressure of mercury. Yield 143 g.; $n_D^{20}$ 1.5113; purity 100.5%.

EXAMPLE 17

*Preparation of N-benzyl-N-(2-m,p-di-methylphenoxyethyl)-2-aminoethanol*

(a) 2-(M,P-DIMETHYLPHENOXY)-ETHANOL 122.2 g. of 4-hydroxy-1,2-dimethylbenzene, dissolved in a solution of 40.0 g. of sodium hydroxide in 60 ml. of water and 500 ml. of alcohol, were brought to reaction with 100.0 g. of ethylene chlorohydrin as described in paragraph (a) of Example 16.

The yield of the hydroxy ether with a B. P. of 130–140° C. at 4 mm. pressure of mercury amounted to 110.3 g.

(b) β-CHLORO-M,P-DIMETHYLPHENETOLE

A solution of 100.0 g. of the above hydroxy ether in 300 ml. of chloroform and 48.0 g. of pyridine were brought to reaction with 75.0 g. of thionyl chloride dissolved in 300 ml. of chloroform as described in paragraph (b) of Example 16.

The yield of the desired product, a nearly colorless oil, amounted to 62.9 g.; B. P. (at 4 mm. mercury) 116–118° C.; $n_D^{20}$ 1.4298; purity 100% (by chlorine determination).

(c) N-BENZYL-N-(2-M,P-DIMETHYLPHENOXYETHYL)-2-AMINOETHANOL 19.0 g. of the above chloride were brought to reaction with 40.0 g. of N-benzyl-2-aminoethanol as described in paragraph (c) of Example 16.

The amino alcohol went over at 6 mm. mercury from 248–250° C.; yield 17.0 g.; $n_D^{20}$ 1.5572; purity 102%.

EXAMPLE 18

*Preparation of N-ethyl-N-(2-o-ethylphenoxyethyl)-2-aminoethanol*

(a) 2-(2-O-ETHYLPHENOXY)-ETHANOL 61.0 g. of o-ethylphenol dissolved in a solution of 20.0 g. of sodium hydroxide in 30 ml. of water and 500 ml. of alcohol were brought to reaction with 55.0 g. of ethylene chlorohydrin as described in paragraph (a) of Example 16.

Yield 19.0 g.; B. P. (4 mm. mercury) 115–125° C.; $n_D^{20}$ 1.5180.

(b) β-CHLORO-O-ETHYLPHENETOLE

A solution of 16.6 g. of the above hydroxy ether in 100 ml. of chloroform and 8.0 g. of pyridine were brought to reaction with 15.0 g. of thionyl chloride in 50 ml. of chloroform as described in paragraph (b) of Example 16.

Yield 13.5 g.; B. P. (4 mm. mercury) 100–110° C.

(c) N-ETHYL-N-(2-O-ETHYLPHENOXYETHYL)-2-AMINOETHANOL 13.0 g. of the above chloride were brought to reaction with 40.0 g. of N-ethyl-2-aminoethanol as described in paragraph (c) of Example 16.

Yield 12.7 g.; B. P. (4 mm. mercury) 160–169° C.; purity 101%.

EXAMPLE 19

*Preparation of N-benzyl-N-(2-thymoxyethyl)-2-aminoethanol*

(a) 2-THYMOXYETHANOL 300.0 g. of thymol
80.0 g. of sodium hydroxide in 150 ml. of water
1000 ml. of alcohol
200.0 g. of ethylene chlorohydrin Procedure as described in paragraph (a) of Example 16.

Yield 236.1 g.; B. P. (4 mm. mercury) 120–132° C.; $n_D^{20}$ 1.5157; purity 101% (determined by acetylation).

(b) THYMYL-β-CHLOROETHYL ETHER 130.0 g. of 2-thymoxyethanol dissolved in 300 ml. of chloroform and 54.0 of pyridine
100.0 g. of thionyl chloride dissolved in 100 ml. of chloroform Procedure as described in paragraph (b) of Example 16.

Yield 96.0 g.; B. P. (3 mm. mercury) 115–119° C.; $n_D^{20}$ 1.5160. Anal.—Calcd. for $C_{12}H_{17}OCl$: Cl, 16.7. Found: Cl, 16.2.

(c) N-BENZYL-N-(2-THYMOXYETHYL)-2-AMINO-ETHANOL 64.0 g. of thymyl-β-chloroethyl ether
100.0 g. of N-benzyl-2-aminoethanol Procedure as described in paragraph (c) of Example 16.

Yield 39.4 g.; B. P. (4 mm. mercury) 232–237° C.; $n_D^{20}$ 1.5472; purity 102%.

EXAMPLE 20

*Preparation of N-benzyl-N-(2-o-isopropylphenoxyethyl)-1-amino-2-propanol*

(a) N-(2-O-ISOPROPYLPHENOXYETHYL)-1-AMINO-2-PROPANOL 80.0 g. of β-chloro-o-isopropylphenetole prepared according to paragraph (b) in Example 16
120.0 g. of 1-amino-2-propanol The chloride was dropped during one hour into the amino alcohol being stirred and heated to 145° C. Heating was then continued for 5 hours at 160° C. After cooling to room temperature, a solution of 16 g. of sodium hydroxide in 30 ml. of water and 300 ml. of alcohol were added. The salt which formed was filtered off and the solution distilled in vacuum. Two distillations at 4 mm. of mercury yielding 63.0 g. of the desired compound with a B. P. of 165–175° C.

Purity 101%; $n_D^{20}$ 1.5112.

(b) N-BENZYL-N-(2-O-ISOPROPYLPHENOXYETHYL)-1-AMINO-2-PROPANOL 16.0 g. of benzyl chloride
59.0 g. of N-(2-o-isopropylphenoxyethyl)-1-amino-2-propanol Procedure as described in paragraph (c) of Example 16.

Yield 21.0 g.; B. P. (4 mm. of mercury) 230–235° C.; $n_D^{20}$ 1.5390; purity 98%.

EXAMPLE 21

*Preparation of N-(o-methylbenzyl)-N-(2-phenoxyethyl)-2-aminoethanol*

(a) N-(2-PHENOXYETHYL)-2-AMINOETHANOL 200.0 g. of β-bromophenetole
360.0 g. of 2-aminoethanol
40.0 g. of sodium hydroxide in 50 ml. of water
400 ml. of alcohol Procedure as described in paragraph (a) of Example 20. Condensation carried out at 100° C.

Yield 113.5 g.; B. P. (4 mm. mercury) 170–180° C.; $n_D^{20}$ 1.5373; purity 101%.

(b) N-(O-METHYLBENZYL)-N-(2-PHENOXYETHYL)-2-AMINOETHANOL 21.0 g. of o-methylbenzyl chloride
55.0 g. of N-(2-phenoxyethyl)-2-aminoethanol Procedure as described in paragraph (c) of Example 16.

Yield 25.6 g.; B. P. (4 mm. of mercury) 225–240° C.

Similarly, compounds wherein B is

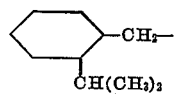

or

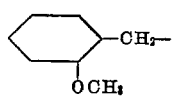

can be prepared.

This is a continuation-in-part application of our co-pending applications, Serial Nos. 781,762, filed October 23, 1947, and 30,736, filed June 2, 1948, both now abandoned.

The foregoing illustrates our invention, which however is not to be limited thereby but is to be construed as broadly as permissible in view of the prior art and limited solely by the appended claims.

We claim:

1. A compound of the class consisting of a free base and acid addition salts with an acid selected from the group consisting of an inorganic acid and a lower alkane sulfonic acid, said free base having the formula,

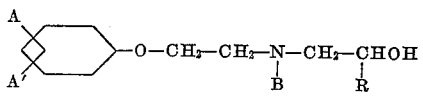

wherein A and A' are selected from H, lower alkyl and lower alkoxy, B is selected from lower alkyl, 1-naphthylmethyl, benzyl, lower alkyl-substituted benzyl, lower alkoxy-substituted benzyl, 2-phenoxyethyl, lower alkyl-substituted 2-phenoxyethyl and lower alkoxy-substituted 2-phenoxyethyl, and R is a member selected from the group consisting of H and lower alkyl.

2. N - benzyl - N - (2 - phenoxyethyl) - 2 - aminoethanol.

3. N - benzyl - N - (2 - o - isopropylphenoxyethyl) - 2 - aminoethanol.

4. N - benzyl - N - (2 - o - toloxyethyl) - 2 - aminoethanol.

5. N - benzyl - N - (2 - o - isopropylphenoxyethyl) - 1 - amino - 2 - propanol.

6. N - (o - methylbenzyl) - N - (2 - phenoxyethyl) - 2 - aminoethanol.

References Cited in the file of this patent

UNITED STATES PATENTS

| Number | Name | Date |
|---|---|---|
| 2,495,772 | Rieveschl et al. | Jan. 31, 1950 |
| 2,599,001 | Kerwin et al. | June 3, 1950 |

OTHER REFERENCES

Wheatley et al.: J. A. C. S., vol 72, 1950, pp. 1655 to 1658.

Nickerson et al.: J. of Pharm. and Exp. Therap., vol. 97 (1949), pp. 25 to 47.